US011951446B2

(12) United States Patent
Liu et al.

(10) Patent No.: US 11,951,446 B2
(45) Date of Patent: Apr. 9, 2024

(54) ACRYLOYLOXY-TERMINATED POLYDIMETHYLSILOXANE (AC-PDMS)-BASED THIN-FILM COMPOSITE (TFC) MEMBRANE, AND PREPARATION METHOD AND USE THEREOF

(71) Applicant: NANJING TECH UNIVERSITY, Jiangsu (CN)

(72) Inventors: Gongping Liu, Jiangsu (CN); Yang Pan, Jiangsu (CN); Wanqin Jin, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/333,528

(22) Filed: Jun. 12, 2023

(65) Prior Publication Data

US 2023/0398504 A1 Dec. 14, 2023

(30) Foreign Application Priority Data

Jun. 14, 2022 (CN) .......................... 202210665583.4

(51) Int. Cl.
*B01D 53/22* (2006.01)
*B01D 67/00* (2006.01)
(Continued)

(52) U.S. Cl.
CPC ......... *B01D 71/701* (2022.08); *B01D 53/228* (2013.01); *B01D 67/00113* (2022.08);
(Continued)

(58) Field of Classification Search
CPC .............. B01D 53/228; B01D 2323/12; B01D 2323/345; B01D 2257/104; B01D 69/105;
(Continued)

(56) References Cited

U.S. PATENT DOCUMENTS 6,818,133 B1 * 11/2004 Wolter .................... C08L 51/08
528/25
7,601,263 B2 * 10/2009 Ebert ..................... B01D 71/70
210/651

(Continued)

*Primary Examiner* — Anthony R Shumate
(74) *Attorney, Agent, or Firm* — JCIPRNET

(57) ABSTRACT

The present disclosure provides an acryloyloxy-terminated polydimethylsiloxane (AC-PDMS)-based thin-film composite (TFC) membrane, and a preparation method and use thereof. In the preparation method, a simple ultraviolet (UV)-induced monomer polymerization strategy based on high UV reactivity among acryloyloxy groups is adopted to prepare the AC-PDMS-based TFC membrane. The high UV reactivity among AC-PDMS monomers can induce the rapid curing of a casting solution to enable the formation of an ultra-thin selective layer and the inhibition of pore penetration for a substrate. By optimizing a UV wavelength, an irradiation time, and a polymer concentration, the prepared AC-PDMS-based TFC membrane has a $CO_2$ penetration rate of 9,635 GPU and a $CO_2/N_2$ selectivity of 11.5. The UV-induced monomer polymerization strategy based on material properties provides a novel efficient strategy for preparing an ultra-thin PDMS-based membrane, which can be used for molecular separation.

6 Claims, 8 Drawing Sheets

(51) Int. Cl.
*B01D 69/02* (2006.01)
*B01D 69/10* (2006.01)
*B01D 69/12* (2006.01)
*B01D 71/70* (2006.01)

(52) U.S. Cl.
CPC ..... *B01D 67/0013* (2013.01); *B01D 67/0018* (2013.01); *B01D 69/02* (2013.01); *B01D 69/105* (2013.01); *B01D 69/107* (2022.08); *B01D 69/12* (2013.01); B01D 2257/102 (2013.01); B01D 2257/104 (2013.01); B01D 2257/504 (2013.01); B01D 2323/12 (2013.01); B01D 2323/345 (2013.01); B01D 2325/04 (2013.01)

(58) Field of Classification Search
CPC .......... B01D 2257/504; B01D 2325/04; B01D 67/00113; B01D 71/701; B01D 2257/102; B01D 69/12; B01D 69/107; B01D 67/0018; B01D 69/02; B01D 67/0013
See application file for complete search history.

(56) References Cited

U.S. PATENT DOCUMENTS

| | | | | |
|---|---|---|---|---|
| 7,708,810 | B2 * | 5/2010 | Foley | B01D 69/141 |
| | | | | 95/55 |
| 8,277,661 | B2 * | 10/2012 | Sah | B01D 69/148 |
| | | | | 210/500.36 |
| 9,784,332 | B2 * | 10/2017 | Bandy | F16F 9/067 |
| 9,873,094 | B2 * | 1/2018 | Hong | C09D 183/08 |
| 2011/0009518 | A1 * | 1/2011 | Yabuuchi | C09D 167/07 |
| | | | | 522/183 |
| 2016/0049324 | A1 * | 2/2016 | Yamaguchi | H01L 21/6835 |
| | | | | 525/216 |
| 2018/0344617 | A1 * | 12/2018 | Jegou | A61Q 5/06 |
| 2018/0369123 | A1 * | 12/2018 | Lion | A61K 8/41 |
| 2020/0002570 | A1 * | 1/2020 | Treadway | C08G 77/04 |
| 2021/0261468 | A1 * | 8/2021 | Stesikova | B33Y 40/10 |
| 2022/0305747 | A1 * | 9/2022 | Breitkopf | B29D 11/0048 |

* cited by examiner

ACRYLOYLOXY-TERMINATED POLYDIMETHYLSILOXANE (AC-PDMS)-BASED THIN-FILM COMPOSITE (TFC) MEMBRANE, AND PREPARATION METHOD AND USE THEREOF

CROSS-REFERENCE TO RELATED APPLICATION

This application claims the priority benefit of Chinese application serial no. 202210665583.4, filed on Jun. 14, 2022. The entirety of the above-mentioned patent application is hereby incorporated by reference herein and made a part of this specification.

BACKGROUND

Technical Field

The present disclosure belongs to the technical field of membrane materials, and specifically relates to a method for preparing an acryloyloxy-terminated polydimethylsiloxane (AC-PDMS)-based thin-film composite (TFC) membrane.

Description of Related Art

TFC membranes show the obvious advantage of rapid and selective penetration during an actual process, and the control of a degree of pore penetration is one of the key factors for acquiring an ultra-thin selective layer. An impact of pore penetration on a membrane is a "double-edged sword". The mechanical interlocking between a polymer and a substrate is crucial for ensuring the interfacial adhesion and mechanical performance. However, excessive pore penetration will increase the resistance and mass transfer distance. In order to acquire a positive overall effect, it is necessary to customize a preparation method for a membrane according to characteristics of a membrane material.

As a representative membrane material with excellent permeability, polydimethylsiloxane (PDMS) has attracted much attention in fields such as nanofiltration, pervaporation, and gas separation. However, the preparation of defect-free ultra-thin PDMS membranes still faces great challenges, which is mainly due to the difficult control of processability of a casting solution and pore penetration of a support. As a typical membrane material with high permeability, PDMS has been extensively investigated and used in gas separation. However, in order to prepare an ultra-thin selective layer, a PDMS casting solution needs to have a low concentration, but a high-fluidity solution will inevitably penetrate into pores of a support, causing serious pore penetration. In order to solve the above problem, some research groups use a high-permeability polymer or a plurality of inorganic materials to prepare a transition layer on a surface of a support, but this strategy complicates a membrane-forming process.

SUMMARY

In order to solve the challenges in preparation of PDMS composite membranes, the present disclosure adopts the novel AC-PDMS, and such PDMS allows the rapid curing of a selective layer without additional modification for a monomer. In essence, a crosslinking mode of such a silicone rubber is based on an addition reaction of an acryloxy-terminated monomer under ultraviolet (UV) irradiation. A reaction rate of the addition reaction is 1 to 2 orders of magnitude higher than a reaction rate of a condensation reaction between traditional hydroxy-terminated polydimethylsiloxane (OH-PDMS) and a crosslinker. The rapid curing of a casting solution effectively inhibits the pore penetration. Therefore, a complete and defect-free PDMS selective layer can be formed, which exhibits excellent separation performance for a $CO_2/N_2$ system. Further, an A4-sized PDMS-based composite membrane is successfully prepared. It shows that the method of the present disclosure has great amplification potential. An overall preparation process is shown in FIG. 1: (a) An AC-PDMS-based composite membrane is prepared based on a rapid addition reaction of AC-PDMS under UV irradiation. (b) The pore penetration problem arises in the preparation of an OH-PDMS-based composite membrane based on a condensation reaction between terminating hydroxy and a crosslinker.

Specific technical solutions are as follows.

The present disclosure provides an AC-PDMS-based TFC membrane, including: a support layer, and a selective separation layer on a surface of the support layer, where the selective separation layer has a structure shown as follows:

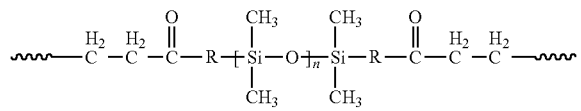

where R is linear or branched alkyl with 1 to 16 carbon atoms; and the AC-PDMS-based TFC membrane is used in gas separation.

A material of the support layer is a porous material.

The porous material is a porous ceramic or a porous polymer.

The selective separation layer has a thickness of 0.1 μm to 5 μm.

The present disclosure also provides a preparation method of the AC-PDMS-based TFC membrane, including the following steps:

step 1: dissolving AC-PDMS and a photoinitiator in a solvent to obtain a casting solution; and step 2: coating the casting solution on the surface of the support layer, conducting UV irradiation to cure the AC-PDMS, and subjecting a resulting product to a heat treatment to obtain the TFC membrane.

In the step 1, a concentration of the AC-PDMS in the casting solution is 1 wt % to 25 wt %, a weight ratio of the AC-PDMS to the photoinitiator is (5-15):1, the solvent is a non-polar solvent, and the non-polar solvent is a hydrocarbon solvent or an ester solvent.

The step 1 further includes adjustment of a viscosity of the casting solution by subjecting the casting solution to intermittent UV irradiation and stirring to control the viscosity of the casting solution at 35 cP to 55 cP.

In the step 1, the AC-PDMS has a structure shown as follows:

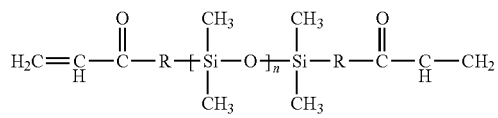

where R is linear or branched alkyl with 1 to 16 carbon atoms.

In the step 2, the support layer is subjected to a water-filling treatment in advance.

In the step 2, the UV irradiation is conducted for 1 s to 30 s.

In the step 2, UV light for the UV irradiation is one selected from a group consisting of ultraviolet A (UVA), ultraviolet B (UVB), and ultraviolet C (UVC), or mixed light of two or more thereof, and is preferably mixed light of UVA and UVC.

In the step 2, the heat treatment is conducted at 60° C. to 90° C. for 5 min to 30 min.

The present disclosure also provides a use of the AC-PDMS-based TFC membrane described above in gas separation.

The gas separation refers to permeable separation of $CO_2$ from a mixed gas, or separation of $O_2$ and $N_2$.

The present disclosure has the following advantages.

In the present disclosure, AC-PDMS is used to prepare a TFC membrane. The high UV reactivity among acryloyloxy groups can induce the rapid curing of a casting solution to enable the formation of an ultra-thin selective layer (260 nm) and the inhibition of pore penetration. By optimizing a UV wavelength, an irradiation time, and a polymer concentration, the prepared AC-PDMS-based TFC membrane has a $CO_2$ penetration rate of 9,635 GPU and a $CO_2/N_2$ selectivity of 11.5. The strategy based on material properties provides a novel effective way to produce an ultra-thin membrane for practical applications in molecular separation.

DESCRIPTION OF THE EMBODIMENTS

Figure 1:
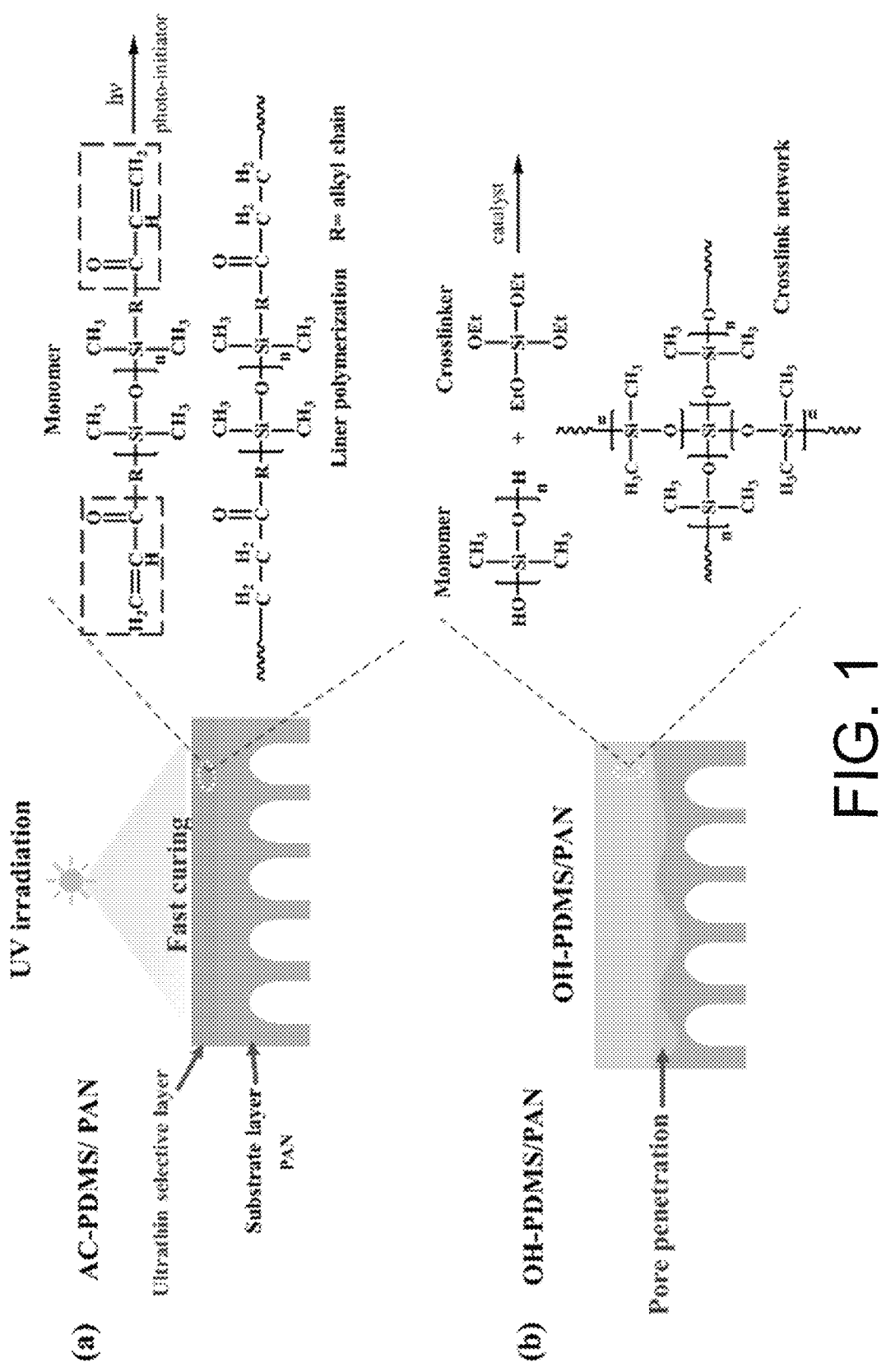
In FIG. 1, (a) is a schematic diagram of preparation of an AC-PDMS-based TFC membrane, and (b) shows the pore penetration problem in preparation of an OH-PDMS-based TFC membrane.

The present disclosure uses AC-PDMS for the first time to rapidly prepare a TFC membrane. In order to allow preparation of a PDMS-based TFC membrane, a simple and efficient UV-induced monomer polymerization strategy is developed. By optimizing a UV wavelength, a viscosity, and an irradiation time, the prepared AC-PDMS-based TFC membrane has a $CO_2$ penetration rate of 9,635 GPU (which is significantly improved) and a $CO_2/N_2$ selectivity of 11.5. Compared with the traditional OH-PDMS, a direct addition reaction between acryloyloxy-terminated monomers leads to rapid curing of a casting solution and effectively inhibits the pore penetration. In addition, the strategy based solely on material properties and a casting mode simplifies a preparation process of a TFC membrane, indicating a huge amplification potential.

The unique crosslinking mode of AC-PDMS changes a stacking state of chain segments, which further affects a mass transfer behavior. The working technique is expected to be used in efficient molecular separation of different types of membrane processes, and to simplify and expand a preparation process of a TFC membrane to efficiently capture $CO_2$.

The materials used in the following examples and sources thereof are as follows.

AC-PDMS (Mw=2,500), OH-PDMS (Mw=8,000), a photoinitiator 1173 (2-hydroxy-2-methylpropiophenone), tetraethyl orthosilicate (TEOS), dibutyltin dilaurate (DBTDL), and n-heptane are purchased from Sigma-Aldrich. The purchased chemical reagents all can be directly used without further purification. The polyacrylonitrile (PAN) support is provided by Beijing Haicheng Filter Shijie Co., Ltd. and has a pore size of 25 nm.

Example 1

1.1 Membrane Preparation Process 1.1.1 Preparation of an AC-PDMS/PAN Composite Membrane A specified amount of AC-PDMS prepolymer was dissolved in n-heptane, and the resulting solution was stirred for 10 min to obtain a homogeneous solution, where a mass concentration of PDMS in the casting solution was controlled at 5% to 25%. A surface of a membrane with a too-thin selective layer formed during a coating process is prone to defects. The photoinitiator 1173 was then added to the homogeneous solution, where a mass ratio of the polymer to the photoinitiator was 10:1. In order to acquire an appropriate viscosity for coating, the resulting casting solution was exposed to UV light for a few minutes to complete the pre-crosslinking. The above step must be conducted in a nitrogen atmosphere. Before being coated, the PAN support needed to be soaked in water to alleviate pore penetration. The casting solution was blade-coated on the support by a casting blade with an appropriate clearance. The support coated with the casting solution was further irradiated in a UV curing machine, where UVA of 365 nm, UVC of 254 nm, and a combination of the two were adopted as light sources to conduct a contrast test. Finally, a product obtained after the irradiation was subjected to a heat treatment at for 10 min to evaporate away excess solvent. An A4-sized composite membrane was prepared by the same process as above, where a mass concentration of PDMS in a casting solution was controlled at 10%.

2.2.2 Preparation of an OH-PDMS/PAN Composite Membrane

A prepolymer of OH-PDMS, a crosslinker (TEOS), and a catalyst (DBTDL) were dissolved in n-heptane, where the polymer, the crosslinker, and the catalyst were in a ratio of 100:10:1. Before being coated, the PAN support needed to be soaked in water to prevent possible pore penetration. When a viscosity of a casting solution was adjusted to an appropriate value, the casting solution was blade-coated on the PAN support by a scraper with an adjustable height. The support coated with the casting solution was dried at room temperature for 24 h and then dried at for 12 h.

2.2.3 Preparation of AC-PDMS and OH-PDMS Homogeneous Membranes

A specified amount of an AC-PDMS casting solution with a polymer concentration of wt % was poured into petri dishes. The Petri dishes were placed in a glove box to isolate oxygen. Because an amount of a casting solution required in preparation of a homogeneous membrane is much larger than an amount of a casting solution required in preparation of a composite membrane, it is important to isolate oxygen. A sample was irradiated with a UV light source for 10 min to obtain a crosslinked membrane, and then the crosslinked membrane was dried in an oven at 80° C. for 1 h to remove excess solvent and photoinitiator.

A preparation process of an OH-PDMS homogeneous membrane was the same as a preparation process of an AC-PDMS homogeneous membrane, except that UV irradiation was not conducted; and OH-PDMS needed to be placed at room temperature for 5 h and then dried at 80° C. The prepared homogeneous membranes would be used in the subsequent gas penetration experiment.

2.3 Gas Separation Experiment

A PDMS membrane was subjected to a pure gas test by a constant-volume and pressure-changing method. When a system was stabilized, a penetration experiment was conducted at 25° C. Each test needed to be repeated at least 3 times. A penetration rate of a component i could be calculated according to the following formula:

$$P_i = \frac{\frac{dp}{dt} \times V}{A \times T \times \Delta p} \quad (1)$$

where $P_i$ represents a gas penetration rate of the component i (1 GPU=$10^{-6}$ cm$^3$ (STP) cm$^{-2}$ s$^{-1}$ cmHg); $\Delta$p represents a transmembrane pressure (0.1 MPa); A represents an effective membrane area; T represents a test temperature (° C.); and dp/dt represents a slope of a pressure change at a penetration side. An ideal selectivity $a_{ij}$ of a membrane was calculated by a ratio of penetration rates of a fast gas and a slow gas:

$$\alpha_{ij} = \frac{P_i}{P_j} \quad (2)$$

A test process of a mixed gas ($CO_2$:$N_2$, 15 vol %:85 vol %) was similar to a test process of a pure gas, except that a composition of a permeate needed to be analyzed by gas chromatography (GC). Moreover, a stage-cut of a feed gas needed to be controlled at 1% or lower by a pressure controller.

Impacts of Membrane-Casting Factors

Figure 2:
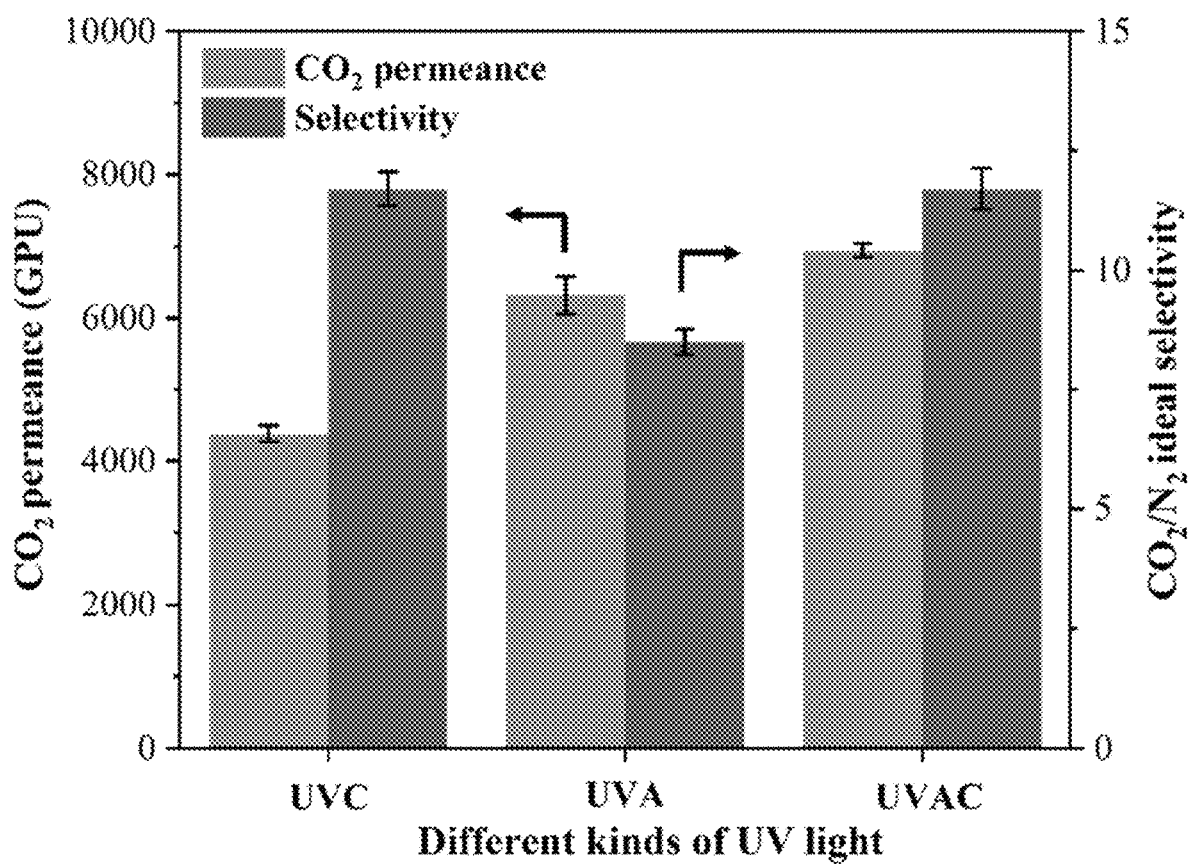
FIG. 2 shows an impact of a UV light source on separation performance of an AC-PDMS-based TFC membrane (test conditions: pure gas, 0.1 MPa, 25° C.).

In the present disclosure, a series of factors were investigated to optimize preparation conditions of an AC-PDMS-based TFC membrane. A wavelength of UV light is critical to production of the membrane. UV light can be divided into the following three types according to wavelengths: UVA (320 nm to 400 nm), UVB (275 nm to 320 nm), and UVC (200 nm to 275 nm). UVA with the longest wavelength has a strong penetrating power, but the energy of UVA is too low to completely cure a membrane surface and overcome oxygen inhibition. Therefore, in the present disclosure, a combination of UVA and UVC was adopted as a light source (UVAC). For easy labeling, membranes prepared with different light sources were named AC-PDMS-UVA, AC-PDMS-UVC, and AC-PDMS-UVAC. As shown in FIG. 2, compared with membranes prepared by other types of UV light, a membrane prepared by UVC exhibited a significant disadvantage in permeability, which was only 4,378 GPU. An AC-PDMS-UVAC membrane prepared by a UVAC combined light source exhibited the highest penetration rate (6,944 GPU) and an inherent selectivity (11.7). A light source may have an important impact on a structure of a polymer. AC-PDMS-UVA exhibited the lowest selectivity, which is attributed to the fact that incompletely-crosslinked AC-PDMS chains fail to construct a complete network for gas separation. UVC meets the demand for sufficient energy in surface curing, but this light source cannot penetrate the entire selective layer, resulting in incomplete curing of the deep casting solution. The fluidity of a casting solution leads to pore penetration, which reduces a $CO_2$ penetration rate. In contrast, UVA with excellent penetration performance guarantees the deep curing and inhibits the pore penetration. Therefore, when a combination of UVC and UVA is used as a light source, the entire AC-PDMS selective layer can undergo complete crosslinking.

Figure 3:
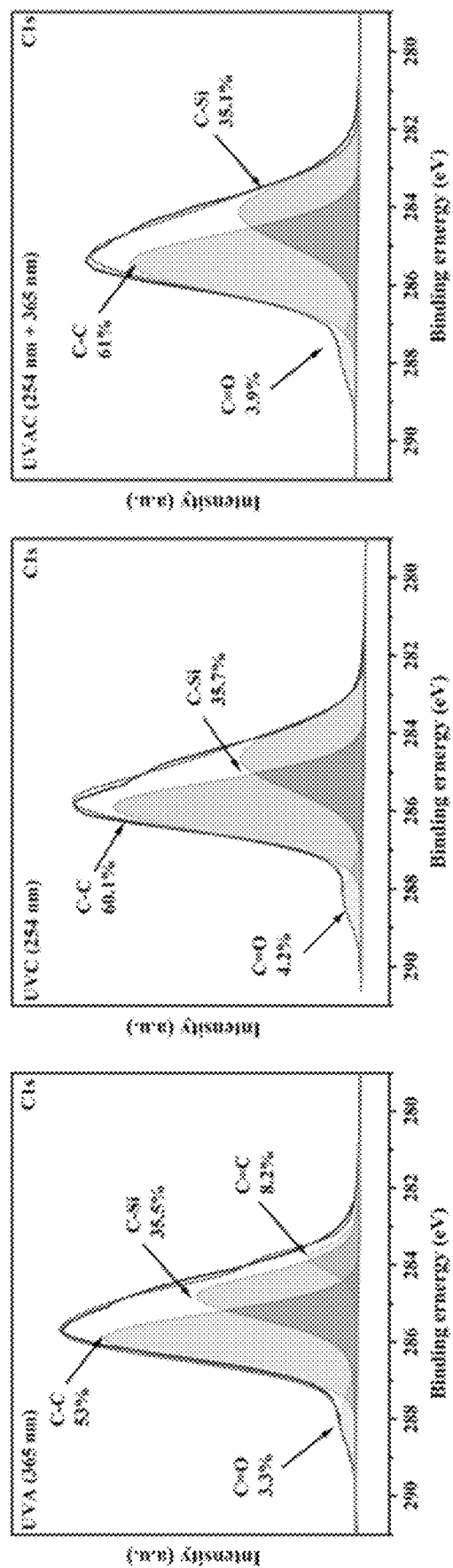
FIG. 3 shows X-ray photoelectron spectroscopy (XPS) C1s spectra of surfaces of composite membranes prepared with different kinds of light sources.

To further verify the inference, XPS was used to determine a chemical bond composition on a surface of a membrane under different UV light sources. As shown in FIG. 3, in a C1s spectrum of AC-PDMS-UVA, four peaks appear at binding energies of 287.8 eV, 285.8 eV, 284.8 eV, and 283.8 eV, respectively, and the four peaks correspond to C=O, C—C, C—Si, and C=C, respectively. Compared with AC-PDMS-UVC and AC-PDMS-UVA, the presence of C=C on a surface of AC-PDMS-UVA indicates that a crosslinking reaction on the surface is incomplete. Contents of C-C groups in AC-PDMS-UVC and AC-PDMS-UVAC indicate that all C=C groups are converted into C-C groups. In addition, a power of a light source is another key factor affecting a degree of a crosslinking reaction. The UVAC combined light source with high intensity and power can enhance the curing of a membrane. In summary, the UVAC combined light source merges the advantages of UVA and UVC, and leads to an AC-PDMC-based TFC membrane with an optimal crosslinked network and composite membrane structure.

Figure 4:
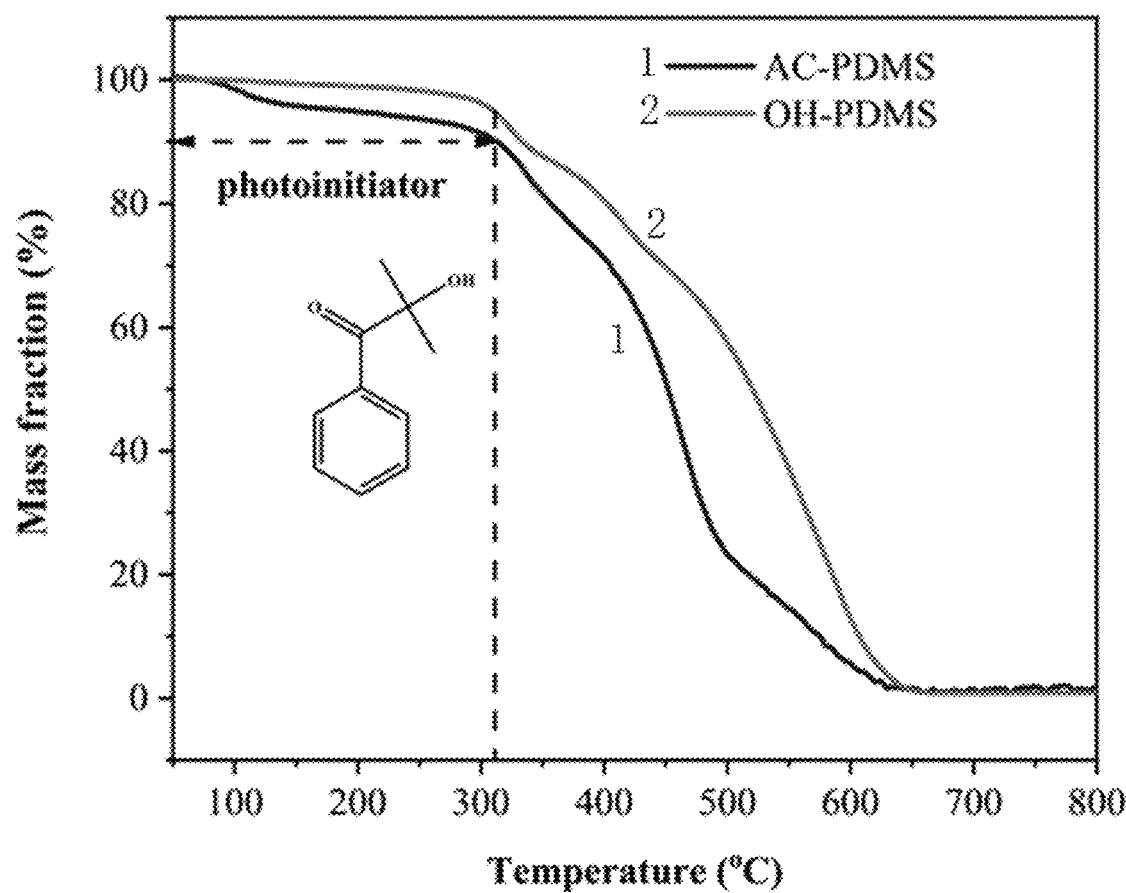
FIG. 4 shows thermogravimetry (TG) curves of AC-PDMS and OH-PDMS-based membranes.

A post-heating process is essential for evaporating a solvent and ensuring a curing degree. In general, an OH-PDMS membrane needs to be heated to construct a complete network. This is because a reaction between an additional Si—OH group and an adjacent crosslinker needs to be conducted at a high temperature (60° C. to 120° C.) for sufficient time in a non-solvent environment. An AC-PDMS membrane also requires a post-heating process, but this post-heating process only involves solvent evaporation without further reaction, because a reaction between acryloyloxy groups stops immediately after UV light removal. As shown in FIG. 4, AC-PDMS undergoes a mass loss in a range of 80° C. to 305° C., which is due to desorption of the photoinitiator 1173 with a boiling point of 80° C. In addition, the mass loss corresponds to a concentration of the photoinitiator. Therefore, the post-heating is conducted at 80° C. It should be noted that, after UV irradiation, the photoinitiator can change from a ground state to an excited state while releasing a large number of free radicals to promote a polymerization reaction. Therefore, the photoinitiator does not participate in an actual crosslinking reaction to affect the separation performance.

Figure 5:
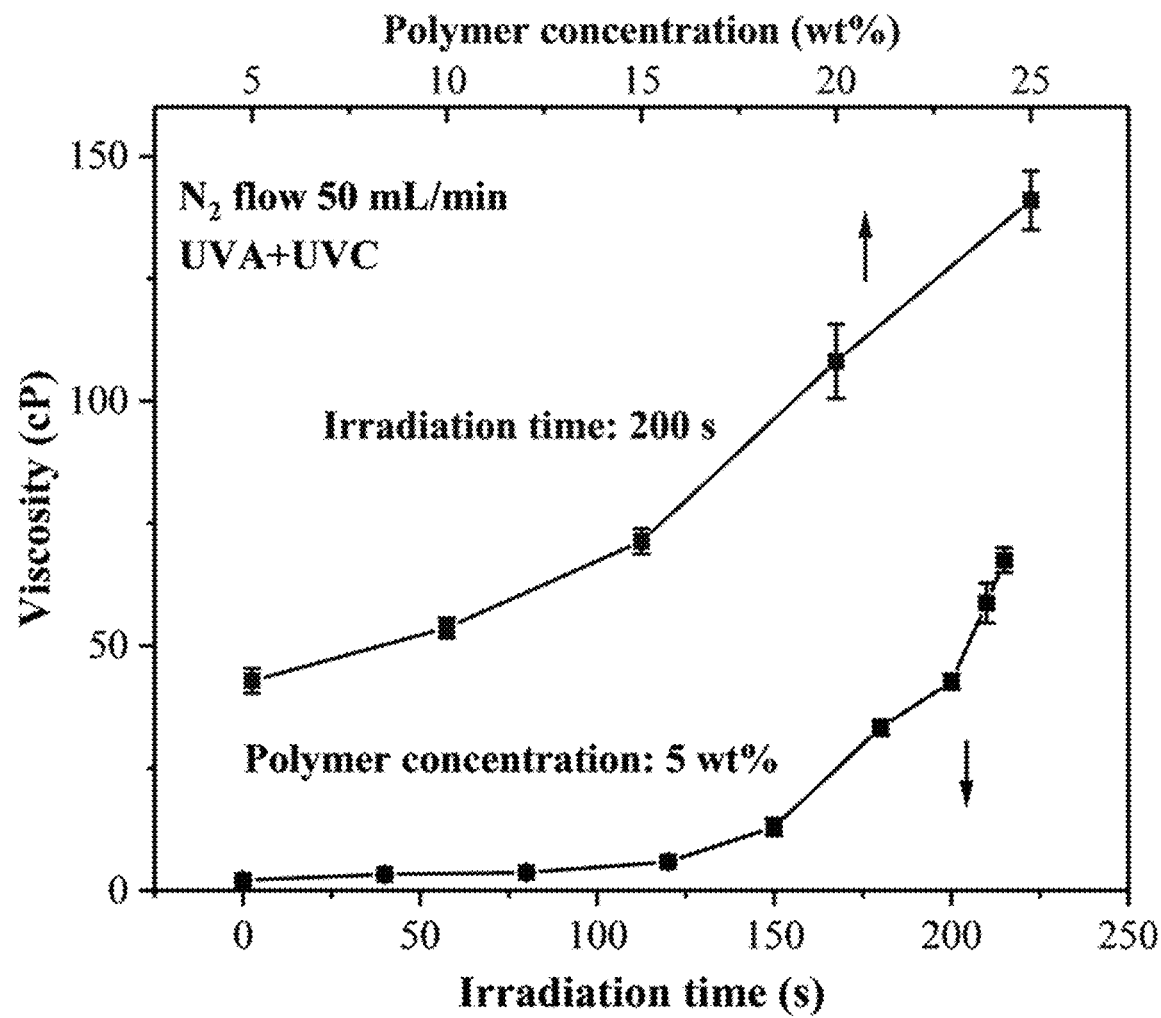
FIG. 5 shows impacts of an irradiation time (prepolymerization process) and an organic concentration on a viscosity of AC-PDMS/n-heptane.

Before being coated, a casting solution needs to undergo pre-crosslinking until the casting solution has an appropriate viscosity, which is a necessary condition for preparation of a defect-free composite membrane. A high viscosity of the casting solution can inhibit pore penetration. A viscosity of traditional OH-PDMS is difficult to control because a condensation reaction is difficult to stop once starting. In contrast, an addition reaction between acryloyloxy groups can be immediately stopped by removing a UV light source. In view of these properties, a viscosity of a casting solution can be controlled by intermittent irradiation (namely, a plurality of times of intermittent short-time irradiation, during which stirring is conducted and an appropriate viscosity is controlled). As shown in FIG. 5, a viscosity of a casting solution is positively correlated with a polymer concentration. After 200 s of UV irradiation, a viscosity of a casting solution with a polymer concentration of 5 wt % reaches 43 cP, which is suitable for coating. A viscosity of a casting solution increases with the increase of total irradiation time; when the irradiation time exceeds 200 s, the viscosity of the casting solution increases sharply; and if the irradiation time is further extended, the casting solution will be transformed into a gel. It should be noted that a continuous $N_2$ flow is necessary for elimination of oxygen in a reaction system.

Figure 6:
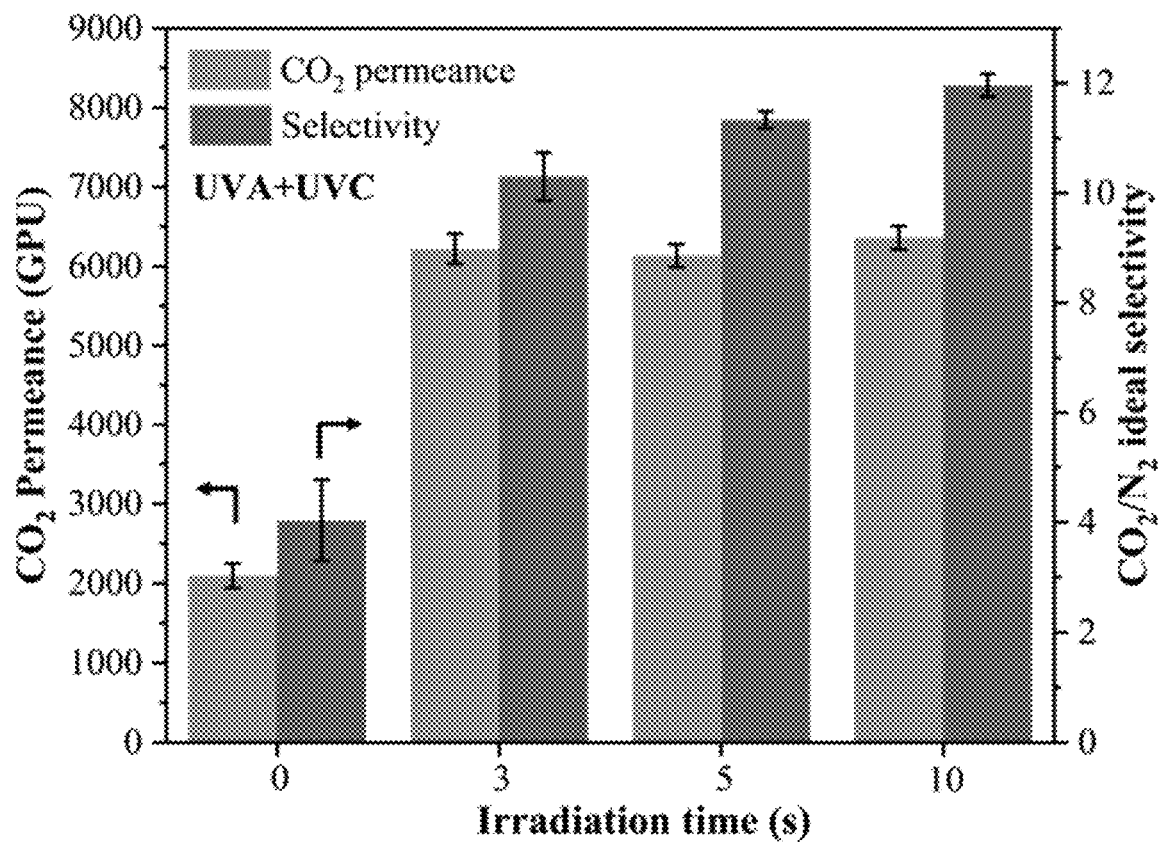
FIG. 6 shows an impact of an irradiation time (curing stage) on performance (AC-PDMS/PANTFC membrane, test conditions: pure gas, 0.1 MPa, 25° C.).

The necessary irradiation time is another key factor affecting the preparation of a membrane. A membrane prepared without UV irradiation does not have an efficient separation ability (FIG. 6). In contrast, the $CO_2$ permeability and $CO_2/N_2$ selectivity increase rapidly after merely 3 s of UV irradiation, which means that such a short irradiation time is enough to construct a complete selective layer; and after the irradiation time is further extended, a denser crosslinked network contributes to a slight increase of selectivity from 11.3 to 12, but the $CO_2$ penetration rate hardly changes. This is because the rapid curing of the casting solution effectively inhibits the pore penetration. In addition, compared with the thermal crosslinking process of the traditional OH-PDMS-based membrane, the extremely-short curing time is expected to reduce the energy consumption of thermal curing.

Figure 7:
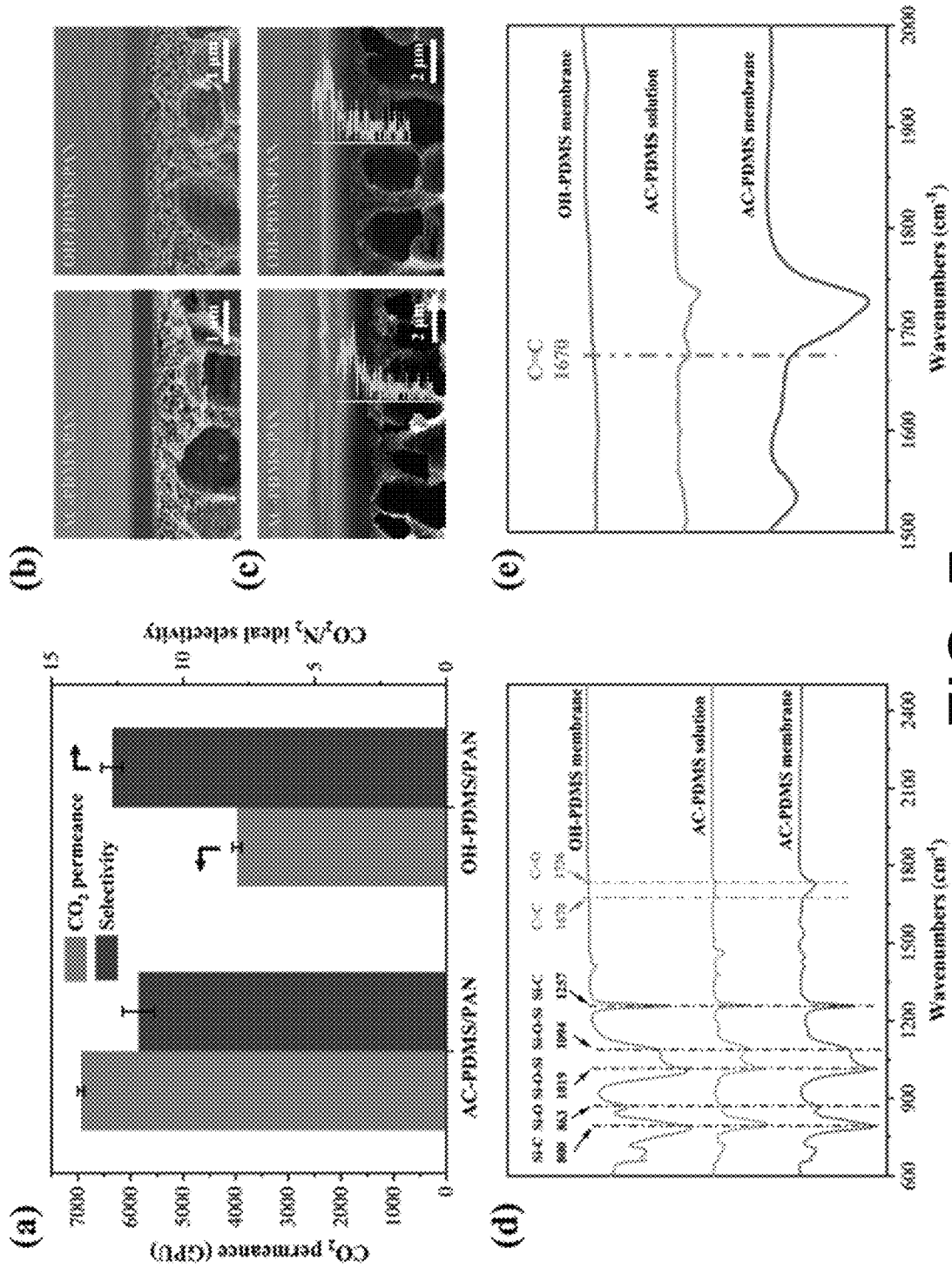
In FIG. 7, (a) shows gas separation performance of AC-PDMS/PAN and OH-PDMS/PAN (pure gas, 0.1 Mpa, 25° C.); (b) shows cross-sectional scanning electron microscopy (SEM) images of AC-PDMS and OH-PDMS-based composite membranes; (c) shows cross-sectional SEM images and Si-element energy-dispersive X-ray spectroscopy (EDX) spectra of AC-PDMS and OH-PDMS-based composite membranes, where a vertical yellow line represents a detection depth, and a thickness of a selective layer is increased to 2 μm to meet an experimental accuracy; (d) shows fourier transform infrared spectroscopy (FTIR) spectra of different homogeneous membranes and an AC-PDMS casting solution; and (e) shows enlarged partial views of the FTIR spectra.

The preparation of the AC-PDMS-based membrane was compared with the preparation of the conventional OH-PDMS-based membrane. As shown in (a) of FIG. 7, a $CO_2$ penetration rate of the AC-PDMS-based composite membrane is almost twice a $CO_2$ penetration rate of the OH-PDMS-based composite membrane, although selective layers of the two membranes both have a thickness of about 500 nm ((b) of FIG. 7), indicating that excessive pore penetration of the OH-PDMS-based composite membrane increases the mass transfer resistance. As shown in (c) of FIG. 7, a strong Si element signal still can be observed in the support layer of the OH-PDMS-based composite membrane, but this signal of the AC-PDMS-based composite membrane is weaker at a same depth, indicating that the rapid curing of the AC-PDMS casting solution has an obvious inhibitory effect on pore penetration. In addition, this method can avoid the introduction of a transition layer. (d) of FIG. 7 and (e) of FIG. 7 show FTIR spectra of the AC-PDMS-based composite membrane and the OH-PDMS-based composite membrane. All samples have representative adsorption peaks of the silicone rubber. Adsorption peaks at 1,256 $cm^{-1}$ and 1,019 $cm^{-1}$ are attributed to bending vibration of Si—CH 3 and asymmetric stretching vibration of Si—O—Si, respectively. Importantly, a peak of C=C at 1,670 $cm^{-1}$ is not observed in the OH-PDMS and AC-PDMS casting solutions, indicating that, after UV irradiation, all C=C bonds are consumed and a surface of the AC-PDMS-based composite membrane is completely cured. The observation of acryloyloxy as a terminating group instead of hydroxy means that an acryloyloxy concentration is higher than a hydroxy concentration. The increased terminating groups and the reduced molecular weight give AC-PDMS high reactivity.

Figure 8:
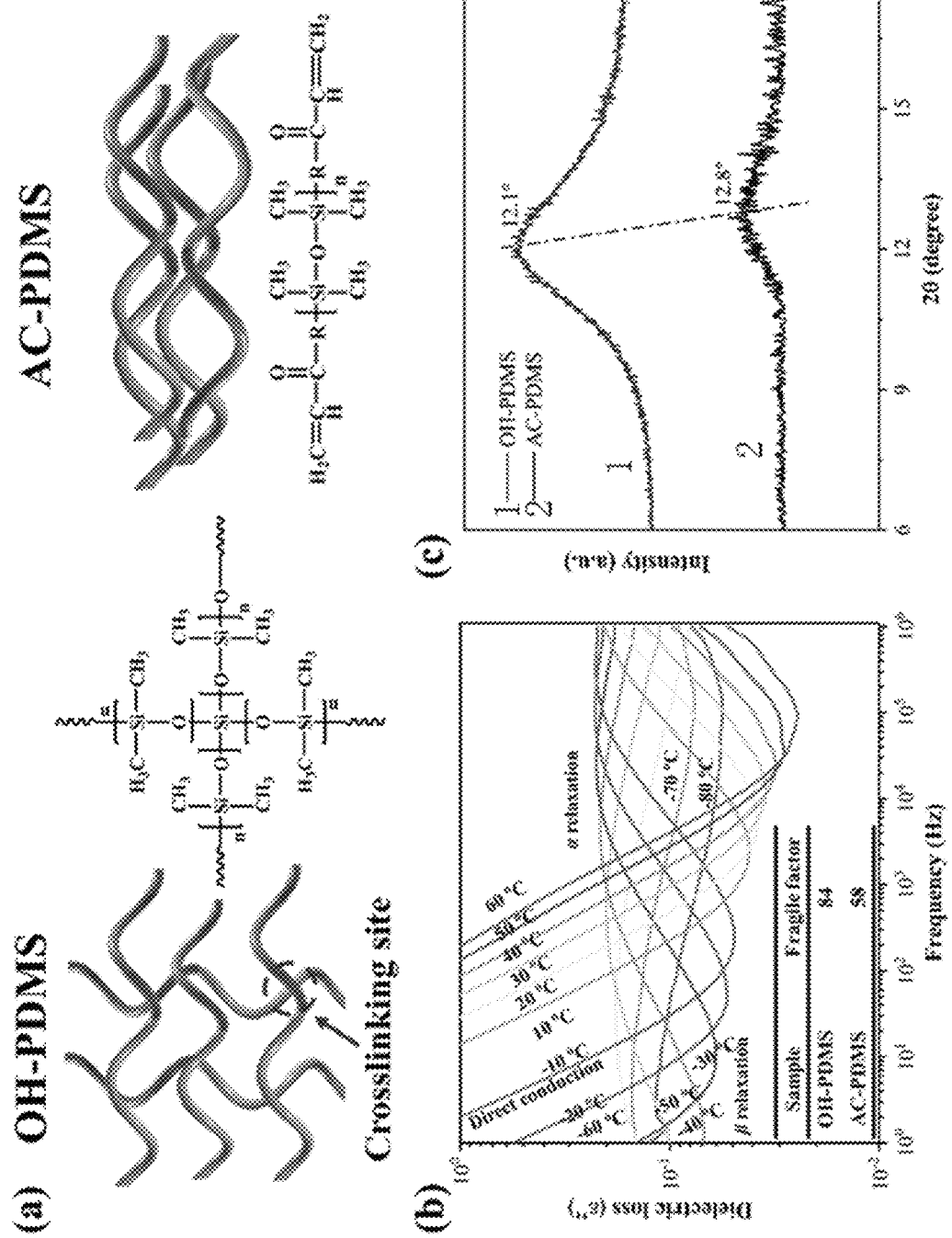
In FIG. 8, (a) is a schematic diagram illustrating structures of polymers of OH-PDMS and AC-PDMS; (b) shows a dielectric relaxation process of AC-PDMS, where an interpolation table shows a fragile factor of AC-PDMS and OH-PDMS; and (c) shows X-ray diffraction (XRD) patterns of AC-PDMS and OH-PDMS.

AC-PDMS is essentially different from OH-PDMS in chemical and physical properties, which is attributed to their respective crosslinking mechanisms. The traditional OH-PDMS tends to undergo a condensation reaction with a crosslinker including four or three active ethoxy bonds (such as TEOS and vinyltriethoxysilane (VTES)) through hydroxy to form a spatial polymerization network. However, under UV irradiation, a length of an AC-PDMS chain segment increases rapidly due to an addition reaction between vinyl groups, and the entanglement of linear polymer chains causes the curing of a polymer matrix ((a) of FIG. 8). The further investigation of an impact of a stacking state of chain segments on a mass transfer behavior is of significance.

Dielectric relaxation spectroscopy (DRS) is an important method to explore a stacking state of chain segments based on dynamics. A relaxation process of AC-PDMS is shown in (b) of FIG. 8. A relaxation process of a polymer is always related to a temperature and an electric field. When a frequency of an electric field is lower than 10 Hz, electric dipoles undergo orientational polarization, which is synchronous with a change of an alternating electric field (AEF). In this case, direct-current conductance contributes to the main dielectric loss. As the frequency increases and the temperature approaches a glass transition temperature (Tg), a side group of a polymer chain segment can respond to a frequency change, resulting in β relaxation. When the temperature is higher than Tg, an increase in mobility of the polymer main chain leads to an increase in the dielectric loss, resulting in a relaxation. Therefore, the information of a relaxation can reflect dynamic characteristics of the main chain. In addition, OH-PDMS exhibits a similar dielectric to AC-PDMS, which is consistent with reports. The a relaxation data can be fit by an HN equation and a VFT equation to obtain a fragile factor, which can reflect a stacking state of polymer chain segments. As shown in the interpolation table, a fragile factor of AC-PDMS is much lower than a fragile factor of OH-PDMS, which means that polymer segments of AC-PDMS are more densely stacked than polymer segments of OH-PDMS. Moreover, XRD results ((c) of FIG. 8) show that, compared with OH-PDMS, a characteristic peak position of AC-PDMS shifts from 12.1° to 12.8°, indicating that OH-PDMS has a larger interchain spacing (3.67 Å) than AC-PDMS (3.47 Å). A value of d-spacing is calculated by a Bragg equation.

What is claimed is:
1. A preparation method of an acryloyloxy-terminated polydimethylsiloxane (PDMS)-based thin-film composite membrane, wherein the acryloyloxy-terminated PDMS-based thin-film composite membrane comprises a support layer, and a selective separation layer on a surface of the support layer, and the selective separation layer has a structure shown as follows:

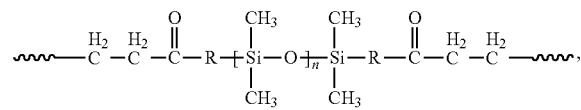

wherein R is linear or branched alkyl with 1 to 16 carbon atoms; the acryloyloxy-terminated PDMS-based thin-film composite membrane is used in gas separation; and the preparation method comprises following steps:

step 1: dissolving acryloyloxy-terminated PDMS and a photoinitiator in a solvent to obtain a casting solution; and step 2: coating the casting solution on the surface of the support layer, conducting ultraviolet irradiation to cure the acryloyloxy-terminated PDMS to obtain a resulting product, and subjecting the resulting product to a heat treatment at 60° C. to 90° C. for 5 min to 30 min to evaporate away excess solvent to obtain the PDMS-based thin-film composite membrane, wherein in the step 1, a concentration of the acryloyloxy-terminated PDMS in the casting solution is 1 wt % to 25 wt %, a weight ratio of the acryloyloxy-terminated PDMS to the photoinitiator is (5-15):1, the solvent is a non-polar solvent, and the non-polar solvent is a hydrocarbon solvent or an ester solvent;

the step 1 further comprises adjustment of a viscosity of the casting solution by subjecting the casting solution to intermittent ultraviolet irradiation and stirring to control the viscosity of the casting solution at 35 cP to 55 cP; and the acryloyloxy-terminated PDMS has a structure shown as follows:

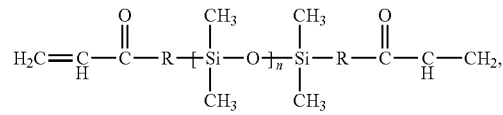

wherein R is linear or branched alkyl with 1 to 16 carbon atoms; and in the step 2, the support layer is subjected to a water-filling treatment in advance, the ultraviolet irradiation is conducted for 1 s to 30 s, and ultraviolet light for the ultraviolet irradiation is one selected from a group consisting of ultraviolet A (UVA), ultraviolet B (UVB), and ultraviolet C (UVC), or mixed light of two or more thereof.

2. The preparation method of the acryloyloxy-terminated PDMS-based thin-film composite membrane according to claim 1, wherein a material of the support layer is a porous material.

3. The preparation method of the acryloyloxy-terminated PDMS-based thin-film composite membrane according to claim 2, wherein the porous material is a porous ceramic or a porous polymer.

4. The preparation method of the acryloyloxy-terminated PDMS-based thin-film composite membrane according to claim 1, wherein the selective separation layer has a thickness of 0.1 μm to 5 μm.

5. The preparation method of the acryloyloxy-terminated PDMS-based thin-film composite membrane according to claim 1, wherein the ultraviolet light for the ultraviolet irradiation is mixed light of UVA and UVC.

6. An acryloyloxy-terminated PDMS-based thin-film composite membrane directly prepared by the preparation method as defined in claim 1.

* * * * *